United States Patent [19]
Chadez

[11] Patent Number: 6,002,814
[45] Date of Patent: Dec. 14, 1999

[54] MEANS AND METHOD FOR CONFIGURING A DATA PROCESSING PIPELINE

[75] Inventor: Clayton Chadez, Nampa, Id.

[73] Assignee: Hewlett-Packard Company, Palo Alto, Calif.

[21] Appl. No.: 09/061,001

[22] Filed: Apr. 14, 1998

[51] Int. Cl.[6] .................................................. G06K 9/54
[52] U.S. Cl. .......................... 382/303; 382/234; 395/114
[58] Field of Search .................................... 382/303, 234, 382/233, 307; 395/114, 115, 116

[56] References Cited

U.S. PATENT DOCUMENTS

| | | | |
|---|---|---|---|
| 4,850,027 | 7/1989 | Kimmel ................................... | 382/303 |
| 5,572,631 | 11/1996 | Kavathekar et al. .................... | 395/115 |
| 5,729,668 | 3/1998 | Claflin et al. ............................ | 395/114 |
| 5,852,742 | 12/1998 | Vondran, Jr. et al. .............. | 395/800.28 |

Primary Examiner—Yon J. Couso

[57] ABSTRACT

A configurable data processing pipeline for processing data, such as print data, provides configuration flexibility, thereby allowing the data processing operations to be optimized for the data, while achieving improved data processing speed. In the preferred embodiment, the configurable data processing pipeline is implemented in an ASIC. The configurable data processing pipeline includes compression/decompression modules, a page strip manager, a color space conversion module, a merge module and a halftone module. A method for controlling the pipeline accepts raster image data after it has been processed by image rendering firmware and prepares the raster image data for transfer to the pipeline. Page rendering firmware performs this function. Next, pipeline control firmware takes control and thereafter operates the pipeline ASIC, independently of the page rendering firmware.

14 Claims, 9 Drawing Sheets

PageQ Element

| | |
|---|---|
| Boolean LL_Data | Indicates the page contains lossless data |
| Boolean LY_Data | Indicates the page contains lossy data |
| Boolean Duplex | Indicates-data is compressed in reverse mode |
| unit32 PixelsPerLine | The number of pixels on each line of the page |
| unit32 LY_PixelsPerLine | The number of lossy pixels for each line on the page |
| unit32 LinesPerPage | The number of lines of data for this page |
| unit32 TopMargin | The number of lines of null data to generate for a top margin for each plane |
| unit32 LeftMargin | The number of pixels of null data to generate for a left margin for every line |
| enum ColorMode | Indicates what color mode the printer will operate in (FullColor or Monochrome) |
| pointer HalftoneTable | Points to a hardware ready table of halftone data |
| pointer LLColorTable | Points to a hardware ready table of data to convert from firmware color space to device color space for lossless data |
| pointer LYColorTable | Points to a hardware ready table of data to convert from firmware color space to device color space for lossy data |
| pointer LYConfigRec | Points to a structure containing the information required to print lossy data |

FIG.3

LLStripQ Element

| | |
|---|---|
| unit32 PixelCount | The number of pixels of data contained in this strip |
| unit32 MergeHTConfig | Hardware ready value for configuring the merge and halftone for this strip |
| pointer DataList | Pointer to the first node of a linked list of DMA data blocks |
| boolean Compressed | Indicates the data for this strip is compressed |
| boolean LastStrip | Indicates this is the last strip of data for a page |

FIG.4

LYStripQ Element

| | |
|---|---|
| unit32 PixelCount | The number of pixels of data contained in this strip |
| pointer DataList | Pointer to the first node of a linked list of DMA data blocks |
| boolean LastStrip | Indicates this is the last strip of data for a page |

FIG.5

| Color Space Conversion Table | |
|---|---|
| Y Data | 5508 Bytes of hardware ready data |
| M Data | 5508 Bytes of hardware ready data |
| C Data | 5508 Bytes of hardware ready data |
| R Data | 5508 Bytes of hardware ready data |

FIG. 7

Halftone Table

Halftone Config
Halftone Linescreen 0
Halftone Linescreen 1
Halftone Linescreen 2

FIG. 6

List Node for DMA Data

| unit 32 DataAddress | Starting address for the DMA data |
| unit 32 ByteCount | Number of bytes of data to DMA |
| pointer NextNode | Points to the next entry in the list |

FIG.8a

MergeHTConfig

FIG.8b

Lossless bits per pixel: Fixed at B-bits per pixel. Firmware Options: with lossless data included Halftone select bits. Firmware Options: Two bits of halftone data included with lossless data
Bypass Halftoner
Use LineScreen 0
Use LineScreen 1
Use LineScreen 2

Merge Select Bits. Firmware Options:
Lossless Only
Lossy Only
One bit merge data included with lossless data

MEANS AND METHOD FOR CONFIGURING A DATA PROCESSING PIPELINE

CROSS REFERENCE TO RELATED APPLICATIONS

This application includes subject matter related to the following U.S. patent applications: "MULTI-PATH DATA PROCESSING PIPELINE", Ser. No. 08/877,345; METHOD AND APPARATUS FOR HALFTONING OF IMAGES IN A PRINTER", Ser. No. 08/877,343; "DATA MERGE UNIT", Ser. No. 08/877,346 now U.S. Pat. 5,915,079; "MERGE PLANE GENERATION FOR A DATA PROCESSING PIPELINE", Ser. No. 08/877,347 now U.S. Pat. No. 5,940,585; and "CONFIGURABLE DATA PROCESSING PIPELINE", Ser. No. 08/878,883 now U.S. Pat. No. 5,852,742; each of which is incorporated by reference herein and is assigned to the same assignee as this application.

FIELD OF THE INVENTION

This invention relates to the processing of data, and more particularly to a method and means for configuring a data processing pipeline for use in a printer.

BACKGROUND OF THE INVENTION

The print data pipeline of a printer performs a number of operations upon print data which enters the pipeline in preparation for printing. These operations include: print data compression, print data decompression, color space conversion, and halftoning. The type of operation performed and the specific order in which the operations are performed can vary depending upon the type of print data which enters the pipeline, the capabilities of the print engine, and the memory available in the printer. The types of print data which may enter the pipeline include: text, line art, images, and graphics.

In prior art pipeline implementations, the various processing operations are performed by a processor under the control of firmware. Depending upon the type of print data entering the pipeline and the operations necessary to process the print data, a number of possible firmware routines are executed to complete the print data processing operations.

As printers increase the density of dot placement (dots per inch), add gray scale capability (using a set of bits per pixel to define a gray scale level), and include color printing capability (requiring additional bits per pixel over monochrome printing), the time required for the printer's data pipeline to process the print data has become substantial. For example, in color printing, the memory required to store data used to print a page can reach thirty two times the memory required for a monochrome printer of the same resolution.

To fully utilize the printing speed capabilities of the print engine, the data pipeline must have the capability to process print data sufficiently fast to supply a continuous stream of print data to the print engine, thereby allowing the print engine to continuously print throughout the print job.

Prior art data pipelines have been implemented using general purpose microprocessors. Although microprocessors have the versatility to be programmed to perform the operations of a data pipeline, they incur substantial overhead in performing these operations, thereby reducing the rate at which print data can be processed. The increasing amounts of print data handled by the processor performing the operations of the data pipeline requires the use of ever higher performance processors to match the printing speeds of the print engines. To improve processing performance, prior art data pipelines have employed Application Specific Integrated Circuits (ASICs) to perform specific operations such as print data compression/decompression and color space conversion. However, the time required to move data between the microprocessor, the ASIC, and memory still contributes considerable overhead to the data pipeline processing operations.

A need exists for a data pipeline having improved speed with which data can be processed while retaining the versatility of a data pipeline implemented with a microprocessor. However, since such a data pipeline is preferably controlled by image processing firmware, it is subject to change when the firmware is altered. Since it is also preferable that the pipeline be configured in the form of an ASIC, such changes can result in design alterations being required of the ASIC to conform to the firmware changes, an obviously expensive proposition.

Accordingly, it is an object of this invention to provide a data pipeline that is configured to accommodate a variety of image processing procedures.

It is another object of this invention to provide a means and method for control of a data pipeline which enables the pipeline to be shielded from the effects of changes to image processing firmware

SUMMARY OF THE INVENTION

A configurable data processing pipeline for processing data, such as print data, provides configuration flexibility, thereby allowing the data processing operations to be optimized for the data, while achieving improved data processing speed. In the preferred embodiment, the configurable data processing pipeline is implemented in an ASIC.

The configurable data processing pipeline includes compression/decompression modules, a page strip manager, a color space conversion module a merge module and a halftone module. A method for controlling the pipeline accepts raster image data after it has been processed by image rendering firmware and prepares the raster image data for transfer to the pipeline. Page rendering firmware initially segregates a page of raster image data into page strips. Pipeline control firmware then selectively processes each page strip to achieve compression and conversion thereof into data blocks that are stored. Next, for each page strip, the page rendering firmware creates a strip queue element which includes information indicating a compression procedure or compression procedures that have been used to achieve the compression and a pointer to a linked list of data blocks which comprise the page strip. Each strip queue element is listed on either or both a lossy strip queue or a lossless strip queue, depending upon the compression procedure(s) used to achieve compression of a respective page strip. A null indicator is placed on a strip queue that was not used during processing of the respective strip.

At this stage the pipeline control firmware takes control and a page descriptor is created which designates global parameters to be used by the pipeline during processing of the page strips. When printing is to begin, the pipeline control firmware builds plural lists of data blocks comprising a page, including a lossy compressed list, a lossless compressed list and a raw data block list. The global parameters are then used from the page descriptor by the pipeline control firmware to program modules in the pipeline and, for each page strip, the page strip manager is programmed to accept data blocks from one or more of the lists of data blocks in accordance with information in an associated strip queue element and to pass the data blocks to one or more modules included in the pipeline. Thereafter, the pipeline is operated by the pipeline control firmware in accord with the programming to decompress data blocks from each page strip and to pass the data blocks to the one or modules in the pipeline.

BRIEF DESCRIPTION OF THE DRAWINGS

A more thorough understanding of the invention may be had from the consideration of the following detailed description taken in conjunction with the accompanying drawings in which.

DETAILED DESCRIPTION OF THE PREFERRED EMBODIMENT

The present invention is not limited to the specific exemplary embodiments illustrated herein. In addition, although the embodiment of the configurable data processing pipeline will be discussed in the context of a color laser printer, one skilled in the art will recognize after understanding this disclosure, that the print data processing pipeline architecture disclosed is applicable to other imaging systems for which improved processing speed and flexibility is achieved by having the capability to configure the hardware blocks and to isolate the hardware blocks from the results of image processing firmware changes.

In color printing, a need exists for a print data processing pipeline which improves the processing speed over microprocessor based data processing pipelines while maintaining flexibility with respect to the order and type of processing operations performed. The use of pipeline control firmware that is substantially independent of the image processing firmware, to configure a data processing pipeline architecture permits the pipeline to be isolated from changes to the image processing firmware.

Flow of Print Data

Figure 1:
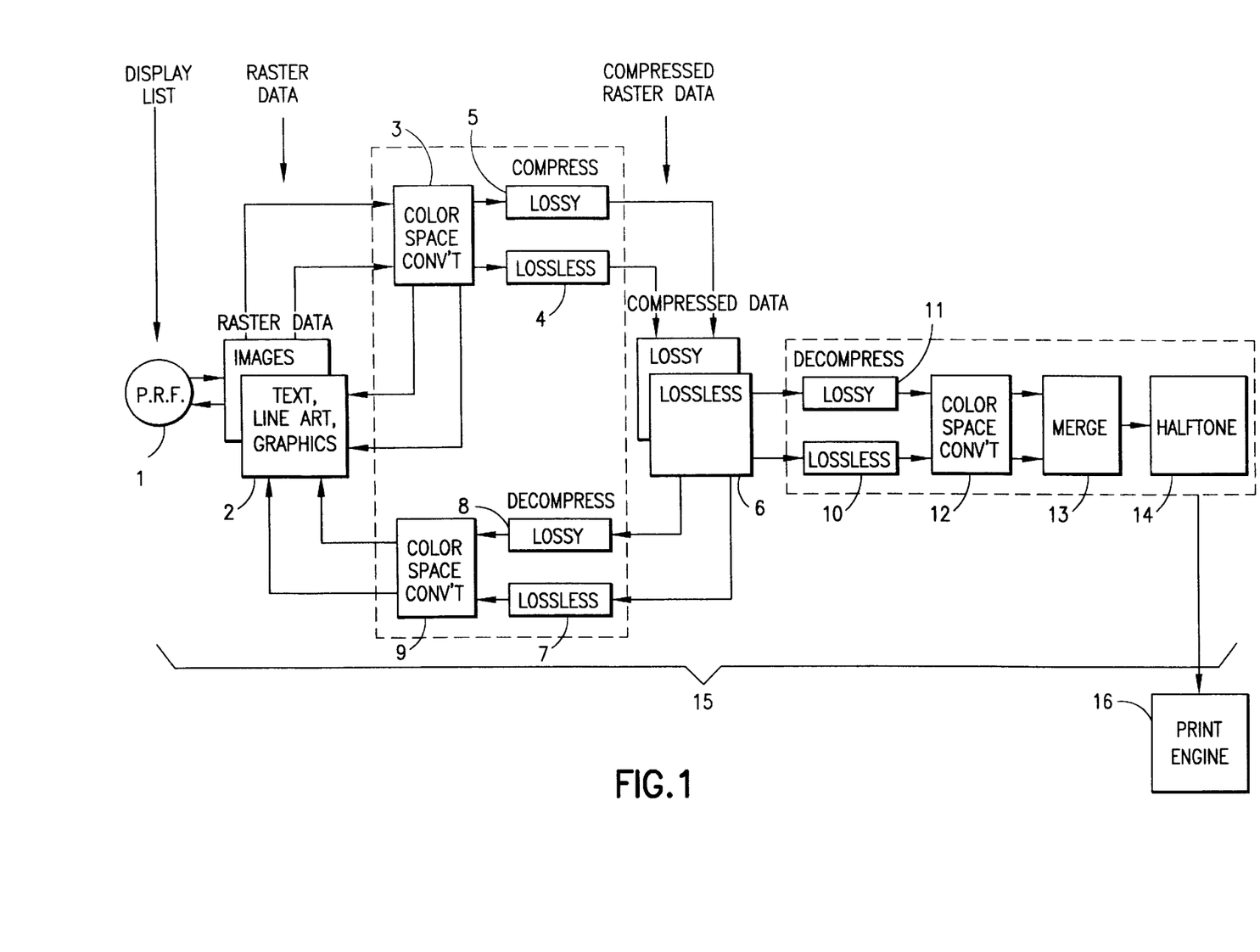
FIG. 1 is a simplified diagram of the flow of print data through a preferred embodiment of a print data processing pipeline in a color printer.

Shown in FIG. 1 is a simplified diagram of the flow of print data through a color printer which includes a print data processing pipeline 15. It should be emphasized that FIG. 1 is intended to illustrate only the flow of print data, using parallel lossy and lossless paths, through typical operations performed by print data processing pipeline 15. FIG. 1 is not a hardware block diagram of the print data processing pipeline 15. As will become apparent from the later description of the hardware block diagram in FIG. 2, the print data processing pipeline 15 may be configured in a variety of different ways to optimize processing of the print data.

Print data input to the system is, for instance, in the form of a display list, which consists of the information necessary to construct a page to be printed. Display list print data may include raster print data along with codes identifying the raster print data as text or image print data, printer control language codes representing text characters, graphics language codes representing a graphics image, or some combination of each of these types of print data. Image processing is performed on display list print data by execution of page rendering firmware (PRF) 1 routines.

Included in image processing operation 1 is a partitioning of the input into page strips. The display list print data is sorted, based upon the vertical position on the page to which it corresponds, for partitioning into page strips. The partitioning involves consideration of the type of print data forming the section of the page corresponding to the page strip.

Each page strip is identified by either one or two strip descriptors. If the page strip is formed from either entirely lossy compressed print data or entirely lossless compressed print data, only a single strip element (i.e., a descriptor) is formed by PRF 1 for that section of the page. However, if the display list print data for that section includes both lossy and lossless compressed print data, two separate strip elements are formed for the strip. One of the strip elements (and associated data blocks) includes only lossy compressed print data, and the other of the strip elements (and associated data blocks) includes only lossless compressed print data.

Formation of lossy and lossless strip elements for the corresponding section of the page occurs when both types of data are present in the display list print data. When both lossy and lossless strip elements are formed, PRF 1 produces a corresponding merge plane. This merge plane consists of a single bit for each pair of corresponding pixel locations in the two page descriptors for indicating in which of the lossy and lossless strip elements the print data for that pixel is contained. The bits forming the merge plane are formed into bytes and transferred through the print data processing pipeline 15 as a stream of bytes. This merge plane is used at a later stage in the print data processing pipeline 15 to combine the lossy and lossless strip data so that the original page strip is reconstructed. This merge operation will be discussed in greater detail below.

For the case in which one strip element is formed for a page strip having only lossy or only lossless compressed print data, all of the print data for that page strip is accessed via that single strip element. In addition, the merge plane associated with that page strip is not generated by PRF 1. Because there is only a single strip element for that section of the page, every bit in the merge plane would be identical. Therefore, it is not necessary to send a merge plane consisting of bytes of all the same value through the print data processing pipeline 15. Instead of generating the merge plane in image processing operation 1, the merge plane is generated at a later stage in the print data processing pipeline 15. This will be discussed below.

PRF 1 also produces a halftone plane with one value corresponding to each pixel location in the page strip As will be discussed below, each halftone value is represented by two bits and determines the halftoning operation applied to the print data corresponding to the pixel. In the event that the halftoning operations to be performed are the same for each pixel in the page strip, the halftone plane is not generated in by PRF 1. Instead, the halftone plane is generated at a later stage in print data processing pipeline 15. This will be discussed below.

The display list print data which has been partitioned into page strip elements, enables retrieval of data blocks of raster print data which are decompressed and passed through the operations of print data processing pipeline 15 as they are generated. Raster print data memory 2 is used to store raster print data generated by PRF 1. The memory space allocated to raster print data memory 2 is of sufficient storage capacity to contain the raster print data for two page strips of the maximum allowable number of lines per page strip, the corresponding size merge plane, and the corresponding size halftone plane.

Typically, the generated raster print data consists of three eight bit bytes for each pixel. Each of the three bytes corresponds to one of the color dimensions in the color space in which the display list print data is expressed. For the color printer in which the preferred embodiment of the print data processing pipeline operates, this is an RGB color space. However, one skilled in the art will recognize that the color space of the input print data could be any color space such as, cyan, magenta, yellow, black (CMYK); hue, saturation, value (HSV); hue, lightness, saturation (HLS); luminance, red-yellow scale, green-blue scale (La*b*); luminance, red-green scale, yellow-blue scale (Luv); Luminance, red-blue scale, green-yellow scale (YCrCb); or YIQ. The generated raster print data could correspond to images, text, line art, graphics or some combination thereof.

As previously mentioned, PRF 1 creates the merge plane for the case in which the display list print data is such that lossy and a lossless compressed image data are contained in a page strip. At a later location in the print data processing pipeline, the merge bits are used to select pixels from the pair of corresponding lossy and lossless strip elements to combine the lossy and lossless decompressed image data, while maintaining the correct spatial relationships between the pixels.

Color space conversion is performed in color space conversion operation 3. The degree of compression achieved on the raster print data is affected by the color space in which the raster print data is expressed. For example, a higher lossy compression ratio, with equivalent image quality, can generally be achieved by performing a color space conversion from a RGB color space to a YCbCr color space and performing the lossy compression operation after conversion to the YCbCr color space. The YCbCr color space is a luminance/hue/chroma type color space in which the Cr and Cb components of the color space each include both hue and chroma information.

Forming a lossy and a lossless strip element from a section of the page corresponding to a single page strip and, in addition, generating a merge plane and a halftone plane, increases the amount of data sent through the print data processing pipeline 15. The merge bit and the two halftone bits associated with each pixel increase the amount of print data. However, because high compression ratios can be achieved for the lossy and lossless compressed strip elements, and because the merge plane and the halftone plane also undergo lossless compression, the memory space required to contain the print data is only slightly increased in the worst case. But, the resulting improvement in the print quality over pipelines which do not apply different data compression algorithms to lossy and lossless data is substantial. For most print jobs, the print data will be either all lossy or all lossless compressed. For these cases, the only increase in the amount of raster print data sent through the print data processing pipeline 15 from the image processing operation 1 is the halftone plane if there are different halftone algorithms applied to the pixels of the page strip. If the same halftone algorithms are applied to all the pixels of the page strip, no halftone plane is generated by PRF 1.

Lossy compressor operation 5 performs compression on blocks of raster print data formed from sections N (e.g. eight) pixels in width along a scan line and M (e.g., eight) successive scan lines in height. In the preferred embodiment of the print data processing pipeline 15, the lossy compression method employed is the well known JPEG algorithm, however, any lossy compression method, such as vector quantization, can be used. If there is a lossless page strip element, compression of this page strip element is performed in lossless compression operation 4. In addition, if there is a merge and a halftone plane corresponding to the page strip elements, both of these are compressed in lossless compression operation 4. The preferred embodiment of the print data processing pipeline employs the type of Lempel-Ziv lossless compression/decompression method disclosed in U.S. Pat. No. 5,455,576, the disclosure of which is incorporated by reference herein. However, any lossless compression/decompression method, such as JBIG, run length, or delta row compression may also be used.

The lossy and lossless compressed raster print data generated by, respectively, the lossy compression operation and the lossless compression operation 4, are stored in compressed raster print data memory 6. The space allocated to compressed raster print data memory 6 is of sufficient size to hold all three color planes of the compressed lossy and lossless raster print data for an entire page, the compressed halftone data for an entire page, and the compressed merge data for an entire page.

By forming lossy and lossless strip elements and then compressing the raster print data in these strip elements using, respectively, lossy or lossless compression methods, the optimal combination of memory compression and image quality is achieved for the print data. The lossy raster print data can be highly compressed using lossy compression techniques while maintaining its visually lossless characteristics. The lossless raster print data is compressed using lossless compression techniques so that no degradation in image quality is experienced, while achieving high compression ratios.

Although it would be possible to perform each of the operations in the print data processing pipeline 15 using a microprocessor, the print data processing performance would be significantly reduced. The microprocessor would be required to alternately handle the lossy and lossless page strip elements to perform the necessary print data compression, color space conversion, and print data decompression operations. In addition, the microprocessor would merge the lossy and lossless pages strip components and perform the halftone operation.

The preferred embodiment of the print data processing pipeline 15 operates with a color laser print engine 16 designed to receive print data expressed in a CMYK color specification. In addition, print engine 16 operates by sequentially developing the toner for each CMYK color plane prior to transferring toner to the paper. The four pass development process used by print engine 16 dictates the manner in which raster print data flows through print data processing pipeline 15. Because of this mode of operation of the laser print engine 16, the raster print data for a page is sent in four successive passes, one pass for each dimension of the CMYK colors, to print engine 16.

As previously mentioned, the compressed raster print data for the entire page is accumulated in the memory space allocated to the compressed raster print data memory 6 as the lossy and lossless strip data blocks are compressed. Conversion of the compressed raster print data to each of the four planes of the CMYK colors of the laser print engine requires sending of the compressed raster print data for the page through the print data processing pipeline 15 in four successive passes. In each of these four passes, the lossless and lossy compressed raster print data is sent over two, single byte wide channels to respective lossless 10 and lossy 11 decompression operations for decompressing. Interleaved with the bytes of lossless compressed raster print data are the compressed merge planes and the halftone planes. The merge planes and the halftone planes are interleaved with the lossless raster print data so that they can undergo lossless compression along with the lossless raster print data. After decompression the merge plane and the halftone plane are extracted from the stream of decompressed lossless print data.

The lossy compressed print data includes the lossy page strip data blocks. After the lossy 11 and lossless 10 decompression operation, both the lossless print data and the lossy print data are sent for color space conversion in color space conversion operation 12. Because print engine 16 uses a four pass development process, the compressed raster print data for all color planes of the page is sent four successive times through the lossy 11 and lossless 10 decompression operations. For each of the four passes of compressed raster print data through lossless 10 and lossy 11 decompression operations into color space conversion operation 12, color space conversion operation 12 generates one of the four planes of the CMYK colors.

Color space conversion operation 12 is performed using the bytes of lossy or lossless raster print data which represent each of the pixels of the page which are to be printed. The raster print data stream output from color space conversion operation 12 includes two eight bit channels formed from the lossy raster print data and the lossless raster print data. The lossless raster print data input to the color space conversion operation 12 is expressed in the RGB color space.

Merge operation 13 receives as inputs the lossless raster print data stream, the lossy raster print data stream, the halftone data stream, and the merge data stream. Each of these print data streams is formed from a stream of bytes. The print data representing a single color plane of the print engine color specification for each of the pixels of the entire page is contained in the lossless and lossy raster print data streams. The function of the merge operation 13 is to combine, pixel by pixel, these two raster print data streams so that the original image, previously split into lossless and lossy page strip elements, is reconstructed for the color plane being processed.

The bits of the merge data associated with each pixel are used by merge operation 13 to determine if the raster print data for the pixel currently being processed is selected from the lossless raster print data stream or from the lossy raster print data stream. Subsequent passes of lossy and lossless raster print data through the merge operation 13 reconstructs the original image for the remaining color planes of the print engine color specification. Each of the pixels corresponds to a location on what will be the printed page. The reconstruction process can be regarded as a spatial synchronization of the lossless and lossy raster print data streams to generate the original image. Furthermore, to achieve the spatial synchronization, the lossless and lossy raster print data streams and the stream of merge data must be synchronized in time.

It should be recognized that a print data processing pipeline architecture which uses separate paths for the lossless and the lossy print data is compatible with a print engine which operates by receiving the raster print data for all color planes of the print engine color specification in a single pass, instead of multiple passes. For this case it is necessary that the color space conversion operation 12 perform a color space conversion on the raster print data representing each pixel to generate each of the corresponding values for the C, M, Y, and K dimensions simultaneously. This requires that color space conversion operation 12 have the capability to simultaneously perform the interpolations necessary to generate each of the C, M, Y, and K dimensions. In addition, merge operation 13 will have to use sufficient memory space to contain a page of raster print data for each of the C, M, Y, and K dimensions.

In the preferred embodiment of the print data processing pipeline 15, the raster print data combined in merge operation 13 is subjected to a halftoning operation 14. The halftone operation 14 is located so that halftoning is the last operation performed on the raster print data prior to the delivery of the print data to print engine 16. The halftone operation 14 performs the halftoning process plane by plane on the merged raster print data as directed by the halftone print data associated with each pixel.

The assignment of the halftone bits to each pixel of raster print data is performed in PRF 1 to build the halftone plane. The print data entering the print data processing pipeline may be text, graphics, or image print data in the form of raster print data, printer control language print data, or graphics language print data. PRF 1 generates the halftone plane for the corresponding lossy and lossless page strip elements according to the type of halftone algorithm which will be applied. For example, the halftone bits for the text print data may be assigned "11", halftone bits for graphics print data may be assigned "10", halftone bits for image print data may be assigned "01", and the halftone bits indicating that no halftone operation is to be applied to the print data corresponding to the pixel may be assigned "00". The assignment of the halftone bits allows the application of a halftone operation optimized for the type of print data associated with the halftone bits. For example, the halftone bits may specify halftone algorithms having line screens with different numbers of lines per inch. Halftone operations are well known in the art of printing.

Merge operation 13 receives as inputs: the lossless raster print data stream, the lossy raster print data stream, the halftone print data stream, and the merge print data stream. Each of these print data streams is formed from eight bit bytes. The print data representing a single color plane of the print engine color specification for each of the pixels of the entire page is contained in the lossless and lossy raster print data streams. The function of the merge operation 13 is to combine, pixel by pixel, these two raster print data streams so that the original image, previously split into lossless and lossy strip elements, is reconstructed for the color plane being processed. Subsequent passes of lossy and lossless raster print data through the merge operation 13 reconstructs the original image for the remaining planes of the print engine color specification. Each of the pixels corresponds to a location on what will be the printed page. The reconstruction process can be regarded as a spatial synchronization of the lossless and lossy raster print data streams to generate the original image. Furthermore, to achieve the spatial synchronization, the lossless and lossy raster print data streams and the print data stream of halftone bits must be synchronized in time.

Configuration of the print data processing pipeline 15 is performed before and during the passage of print data through the print data processing pipeline 15. Some parameters of the pipeline can be configured for each page, some for each color plane, and some for each page strip. The number of lines per page and the number of pixels per line are configurable on a page basis. In addition, the number of color planes processed by the print data processing pipeline 15 (i.e. will the image be printed in monochrome or full color) is configurable on a page basis.

Processing the raster print data for each color plane requires configuration of the color space conversion operations 3, 9, 12. Prior to the performance of color space conversion operations 3, 9, 12, the color space conversion table required for conversion to the intended color plane of the output color space is loaded. Furthermore, processing of each color plane through halftone operation 14 involves configuration of halftone operation 14 so that the correct halftone table is used for halftoning the color plane.

Pipeline Block Diagram and Operation

Figure 2:
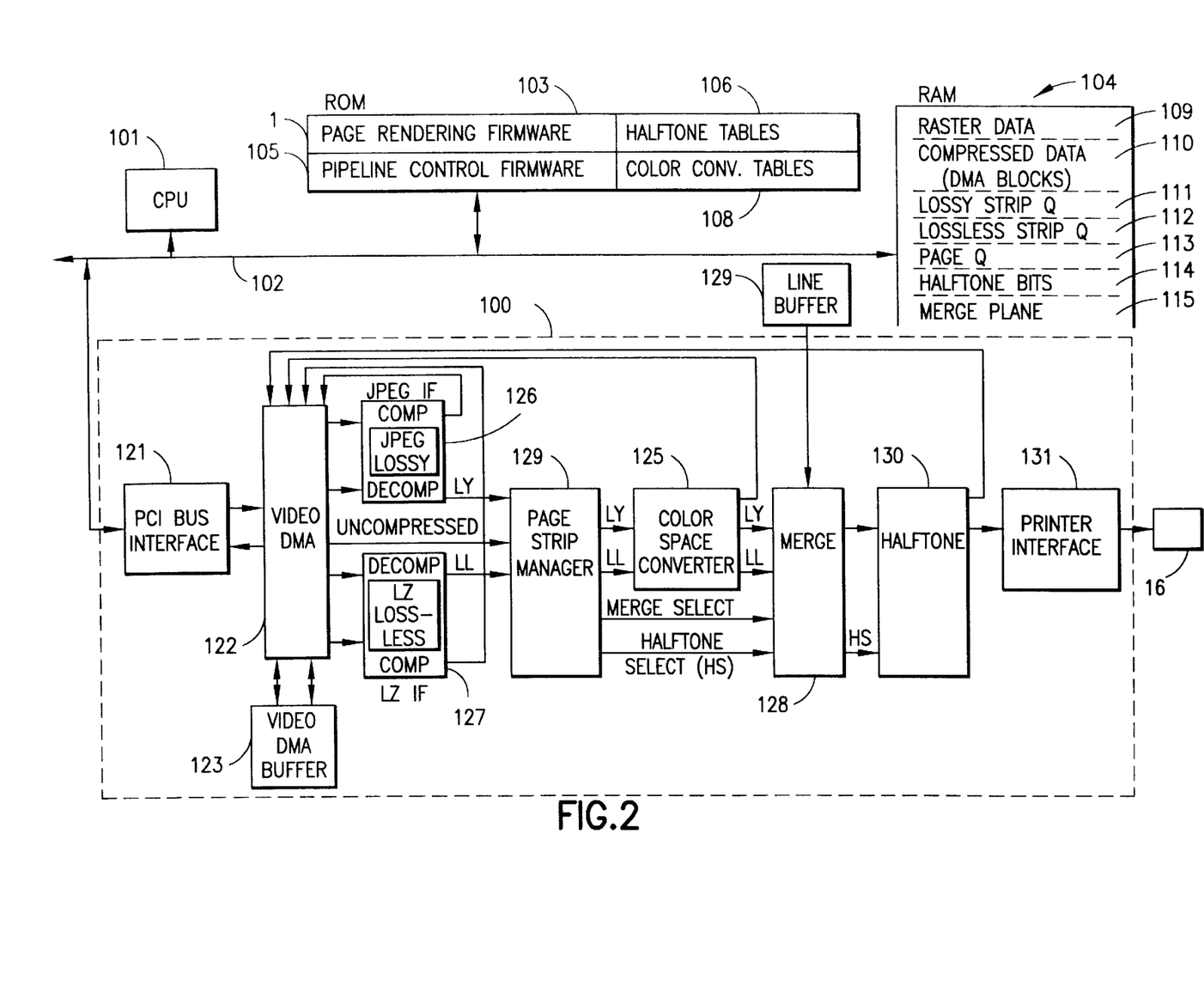
FIG. 2 is a simplified hardware block diagram of the preferred embodiment of the print data processing pipeline.

Shown in FIG. 2 is a simplified hardware block diagram of the preferred embodiment of the print data processing pipeline 15. It should be noted that the paths connecting the functional blocks shown in FIG. 2 represent data paths. Not shown in FIG. 2 are the various control lines used to control the flow of data between the functional blocks. In the preferred embodiment, compression/decompression operations 4, 5, 7, 8, 10, 11, color space conversion operations 3, 9, 12, merge operation 13, and halftone operation 14 are implemented in an ASIC 100. The preferred embodiment of print data processing pipeline 15 is configured for connection of the ASIC 100 to a PCI bus 102. One of ordinary skill in the art will recognize that print data processing pipeline 15 may be configured for connection to other types of busses, such as a VESA bus. PRF 1 is performed by a processor 101 which communicates with the print data processing pipeline 15 over PCI bus 102. Also coupled to PCI bus 102 is a read only memory (ROM) 103 and a random access memory 104. ROM 103 stores PRF 1, pipeline control firmware (PCF) 105, halftone tables 106 and color conversion tables 108.

RAM 104 stores both raster image data 109 and compressed data 110 (lossy and lossless) in the form of data blocks that are accessible by a direct memory (DMA) access procedure (i.e., "DMA blocks"). RAM 104 further provides storage areas for a lossy strip queue 111 and a lossless strip queue 112. Lossy strip queue 111 stores a list of DMA blocks containing data compressed using a lossy compression procedure; and lossless strip queue 112 stores a list of DMA blocks containing data compressed using a lossless compression procedure (or raw, uncompressed data). Together, queues 111 and 112 contain all print data for a page.

RAM 104 further stores a page queue 113 which comprises a list of pages that are ready to print and DMA data blocks 116. For explanatory purposes, it will be assumed that RAM 104 also stores both halftone bits 114 and a merge plane 115 for the current page being processed, even though such data is, in fact, interleaved in and with the DMA data blocks. The function of each of the aforementioned queues, in conjunction with pipeline control firmware (PCF) 105, will be considered below in connection with the logic flow diagrams shown in FIGS. 9a–9c.

ASIC 100 interfaces to PCI bus 102 through PCI bus interface 121. PCI bus interface 121 includes registers necessary for configuration of PCI bus interface 121 and registers used for buffering print data as it flows between Ram 104 and ASIC 100.

A direct memory access controller (video DMA 122), controls the flow of print data into and out of the parts of ASIC 100 which perform the various functions of print data processing pipeline 15. Video DMA buffer 123 temporarily stores print data as it passes through video DMA 122 to match the print data rates between PCI bus 102 and the various functional blocks of ASIC 100 as print data moves in and out. Use of video DMA buffer 122 compensates for the mismatch in the rate of data flow between PCI bus interface 121 and the functional blocks in the remainder of ASIC 100.

Several important advantages result from the implementation of the print data processing pipeline 15 in ASIC 100. A first advantage is the efficient way in which the processing operations for the print data processing pipeline 15 are accomplished internal to ASIC 100. By locating all of the operations on ASIC 100, print data can be transferred between successive operations without incurring the processing overhead which would result if transfers of print data took place over PCI bus 102 between separate integrated circuits dedicated to performing single print data pipeline processing operations. A second advantage is the ability to configure ASIC 100 to selectively bypass print data around functional blocks within the ASIC 100. A third advantage is the ability to selectively feedback the output of a functional block to the video DMA 122 for routing to another functional block or for storage in memory.

Depending upon the type of operation the print data processing pipeline 15 is to perform upon the print data loaded from PCI bus 102, video DMA 122 is configured to deliver the print data to the appropriate functional block in ASIC 100. If color space conversion is required, print data is sent by video DMA 122 to page strip manager 124. Page strip manager 124 sends the print data from video DMA 122 into the appropriate lossy or lossless input of color space converter 125. In addition, page strip manager 124 extracts the merge data and the halftone data interleaved with the lossless raster print data and sends each of these over separate byte wide channels to merge unit 128. If compression or decompression of print data is required, print data is directed by video DMA 122 to the appropriate compression or decompression input on lossy compressor/decompressor 126 or lossless compressor/decompressor 127.

Merge unit 128 performs the merge operation 13 on the lossy and lossless raster print data streams emerging from color space converter 125. Line buffer 129 includes SRAM for buffering of the lossy and lossless raster print data and the merge and halftone data used in the merge operation 13. Halftone unit 130 performs the halftone operation 14 on the merged raster print data stream, corresponding to each of the pixels, according to the bits specified in the halftone plane. Although not explicitly shown in FIG. 2, both color space converter 125 and halftone unit 130 can be configured to bypass print data around these functional blocks if the operations to be performed upon the print data do not include color space conversion and/or halftoning.

As operations are completed upon print data flowing through the print data processing pipeline, the print data may be transferred from ASIC 120 into RAM 104 and at a later time back into ASIC 120 for further processing. For example, after the lossy 5 and lossless 4 compression operations are performed, respectively, in lossy 126 and lossless 127 compressors/decompressors, the resulting compressed raster print data can be routed to video DMA 122, through PCI bus interface 121, and then over PCI bus 102 to compressed print data area 110 in RAM 104.

When the compressed raster print data is to be decompressed, it is transferred over PCI bus 102, to ASIC 100 and PCI Bus Interface 121. The data is then directed by video DMA 122 into the decompress input of either or both lossy 126 and lossless 127 compressors/decompressors.

After the color space conversion operation 3 is performed upon the lossy and/or lossless raster print data, the resulting raster print data can be returned to lossy 126 compressor/decompressor and/or lossless 127 compressor/decompressor through video DMA 122, or, it can be returned to RAM 104 through video DMA 122, and PCI bus interface 121, or, it can be sent to merge unit 128 for performance of merge operation 13. Included in color space converter 125 is a selector which directs the lossy or lossless color space converted raster print data to the lossy or lossless outputs of color space converter 125 which are coupled to the lossy and lossless print data inputs of merge unit 130.

Page strip manager 124 manages the raster print data so that color space conversion operations 3, 9, 12, merge operation 13, and halftone operation 14 of print data processing pipeline 15 receive a stream of raster print data having a uniform format. For example, in situations in which only a single lossy or lossless strip element is generated in PRF operation 1, page strip manager 124 will generate a corresponding lossy or lossless strip element, as is appropriate, of null print data so that corresponding lossy and lossless page data blocks will be sent on the lossy and lossless paths to color space converter 125. In addition, for the case in which only a single lossy or lossless strip element is generated by PRF operation 1, page strip manager 124 generates the corresponding merge plane which will be formed of the same bit corresponding to each pixel of the page strip element. Furthermore, for the case in which the same halftone processes are applied to each pixel of the page strip, page strip manager 124 generates the halftone plane corresponding to the page strip Page strip manager 124 will send the merge data and the halftone data over separate byte wide paths to the merge unit 128.

Page strip manager 124 receives the decompressed lossy and lossless raster print data over separate channels. When compressed lossy raster print data is decompressed by lossy compressor/decompressor 126, resulting x pixel by y pixel blocks for each dimension of the color space are stored in output buffers included in lossy compressor/decompressor 126. Page strip manager 124 receives a stream of the lossy raster print data sent from the output buffers. The bytes of the decompressed lossy raster print data corresponding to each pixel are sent from the output buffers of lossy compressor/decompressor 126 as successive bytes with one byte corresponding to each dimension of the color space. Page strip manager 124 assembles the corresponding bytes of lossy raster print data for a pixel and sends them as a bit stream of lossy raster print data to color space converter 125.

Page strip manager 124 receives the decompressed lossless raster print data as a stream of successive bytes for each lossless pixel. Interleaved with the lossless raster print data sent from lossless compressor/decompressor 127 are the merge data and the halftone data. The interleaving is done so that bytes of lossless raster print data corresponding to a single line on the printed page are sent, followed by the necessary number of bytes of merge data and halftone data to correspond to the line of lossless raster print data. Page strip manager 124 extracts the merge data and the halftone data and sends them over separate channels to merge unit 128. Page strip manager 124 assembles the three corresponding bytes of lossless raster print data for a pixel and sends them as a bit stream of lossless raster print data to color space converter 125.

In some cases Video DMA 122 bypasses the compression step and sends raster print data directly to page strip manager 124. This may be done when a page of raster print data is sent to print engine 16 without compression and stored in raster data area 109 in RAM 104. In this case raster print data flows through print data processing pipeline 15 in a linear fashion without taking any of the various feedback paths. It is also possible that raster print data can be sent directly from Video DMA 122 to page strip manager 124, through the subsequent print data processing pipeline 15 processing operations, such as color space conversion and halftoning, return on a feedback path through video DMA 122 for sending to the appropriate compressor, and then return the compressed raster print data to Video DMA 122 for storage in memory.

The preferred embodiment of merge unit 130 selects from the lossy and lossless raster print data streams to form a single data stream using the merge bits to reconstruct the original image.

Control Data Structures

Prior to describing the detailed operation of the pipeline control firmware (PCF), a description will be provided of control data structures which are utilized to enable operation of pipeline 100. As shown in FIG. 2, RAM 104 includes a lossy strip queue 111 and a lossless strip queue 112. In addition, a page queue 113 is stored therein and lists the various pages that are queued for printing.

Figure 3:
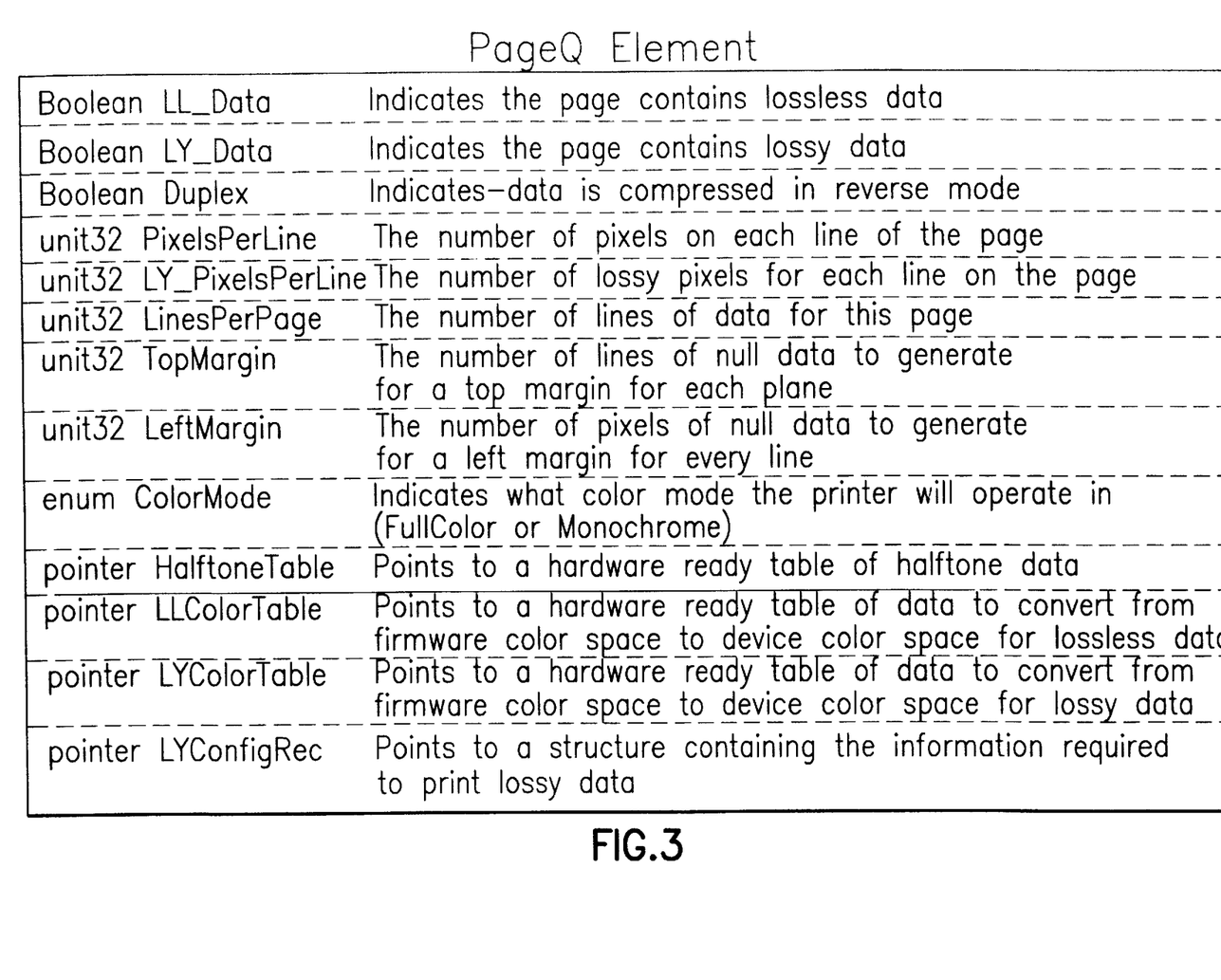
FIG. 3 is schematic illustration of data included in a page queue element.

FIG. 3 illustrates the contents of the control data structure which comprises each page queue element in page queue 113. There is one page queue element for each page to be printed by print engine 16. As will be understood from the following, each page queue element describes the structure of a page and provides parameters which control the presentation of data making up the page.

More specifically, each page queue element includes the following: Boolean values which indicate whether the page contains lossless data, lossy data and/or whether the data is compressed in a reverse mode; values which define the number of (i) lossy pixels for each line on the page; (ii) lines of data for the page; (iii) lines of null data to generate a top margin for each color plane used for the page; and (iv) pixels of null data to generate a left margin for every line. A further value indicates what color mode the printer will operate in, i.e. either full color or monochrome. Finally, there are a number of pointers in each page queue element as follows: one pointer which points to a halftone table; a second pointer which points to a table which enables conversion of an input color space to a printer color space for lossless data; another pointer which points to a table for conversion of an input color space to a printer color space for lossy data and a still further pointer to data required to print lossy data.

Figure 4:
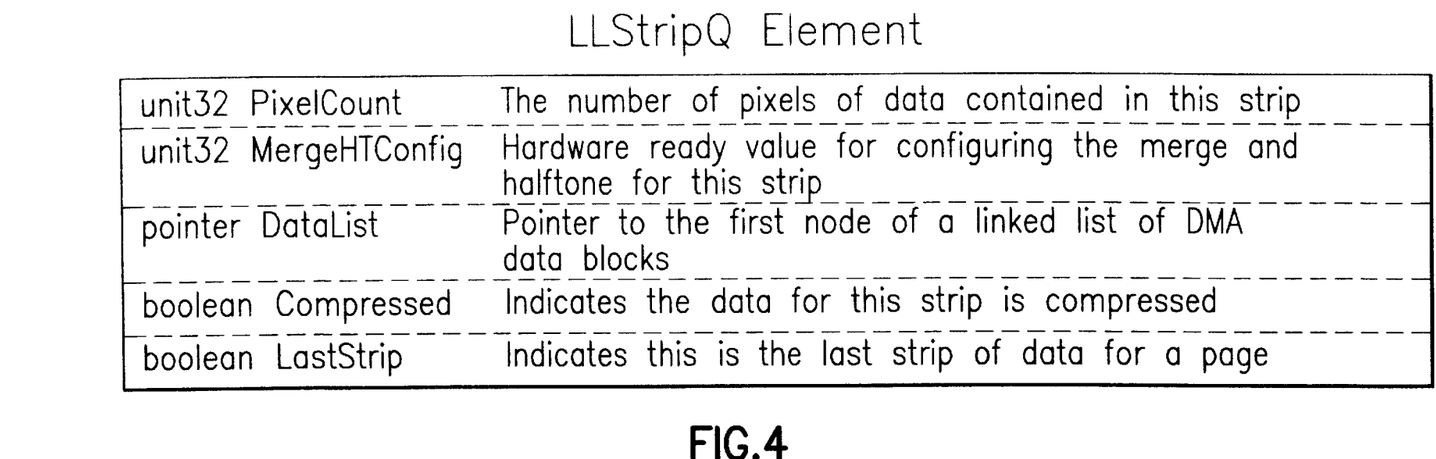
FIG. 4 is schematic illustration of data included in a lossless strip queue element (i.e., a strip wherein at least a portion may have been compressed using a lossless compression procedure).

As indicated above lossless strip queue 112 contains a number of lossless strip queue elements, each of which describes a page strip and its contents. An exemplary lossless strip queue element is shown in FIG. 4 and includes the following data: a value providing a pixel count equal to the number of pixels contained in the strip; a value which enables configuration of the merge plane and halftone table for the strip; and a pointer to the first data block of a linked list of data blocks which include all of the print data for the page strip. Further, there are two Boolean values, one which indicates that the data for this strip is compressed and the other which indicates whether the strip is the last strip of data for a page.

Figure 5:
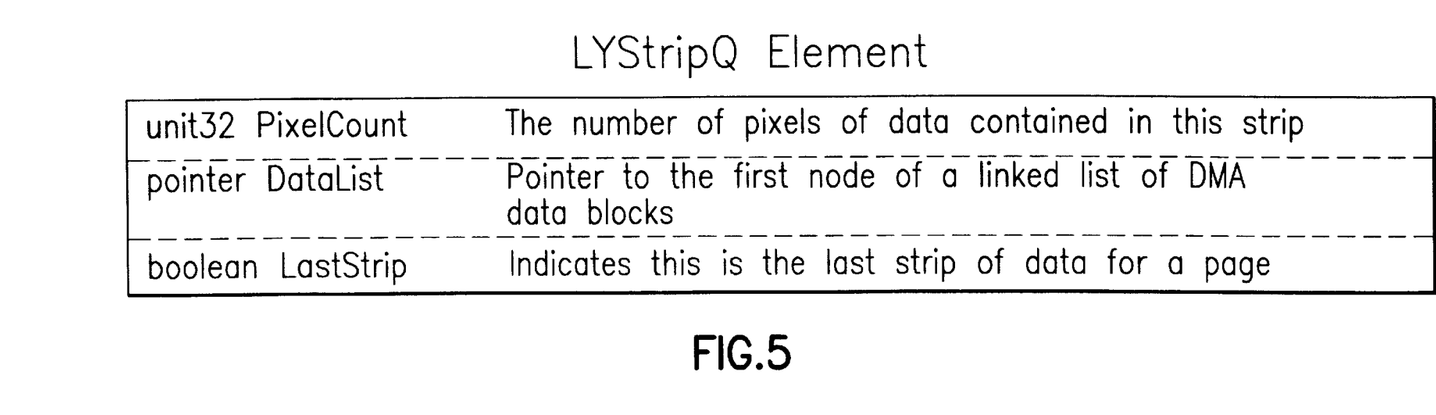
FIG. 5 is schematic illustration of data included in a lossy strip queue element (i.e., a strip that has been compressed using a lossy compression procedure).

Lossy strip queue 111 includes a plurality of lossy strip queue elements that are configured as shown in FIG. 5. Each such element includes a value which defines the number of pixels of data contained in the strip; a pointer to the first data block of a linked list of data blocks which include data to be printed in the strip (and which have been compressed using a lossy procedure); and a Boolean value indicating whether this page strip is the last strip of data for the page.

Figure 6:
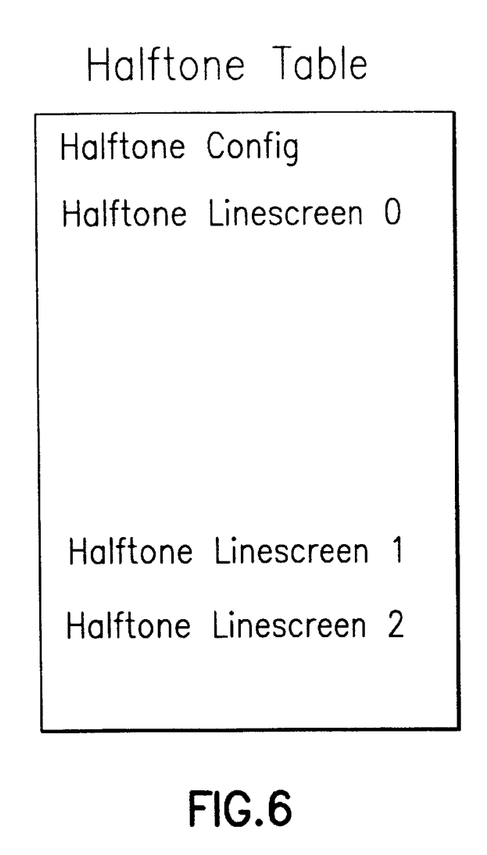
FIG. 6 is schematic illustration of data included in a halftone table used with the invention.
Figure 7:
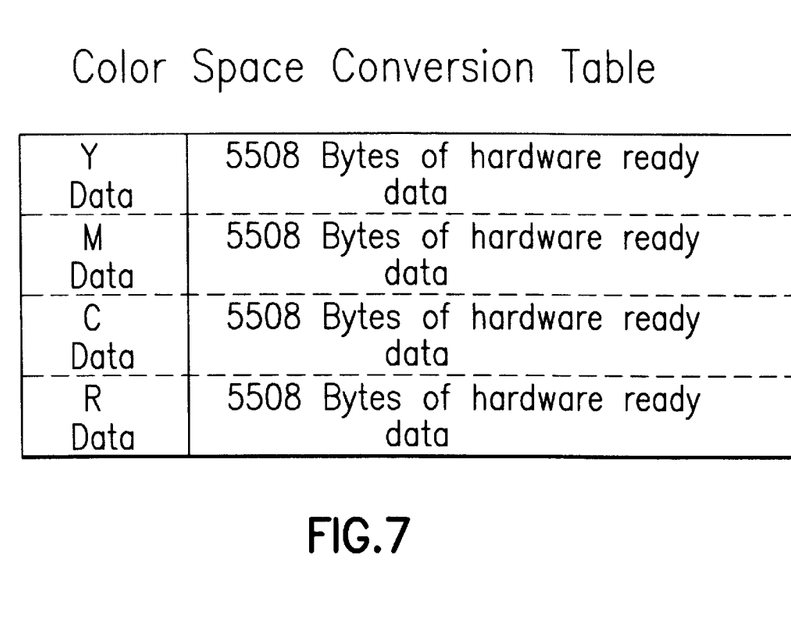
FIG. 7 is schematic illustration of data included in a color space conversion table used with the invention.

As shown in FIG. 6, a halftone table is also provided which stores a plurality of line screens that are selectable for use with a halftone procedure. A further table is shown in FIG. 7 which enables color space conversion of an input color space to a printer color space. The color space conversion table includes bytes of data which define color conversion values for yellow (Y), magenta (M), cyan (C), and black (K) color planes.

Figure 8A:
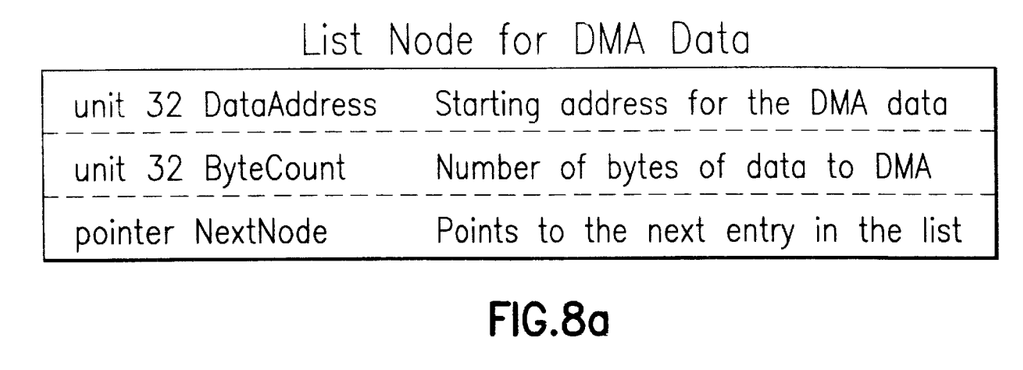
FIG. 8a illustrates the data structure of a list node for data blocks that are accessed via a DMA procedure (i.e., a direct memory access).

FIG. 8a illustrates the data structure of a list node for data blocks that are accessed via a DMA procedure. Each lossy strip queue element and lossless strip queue element includes a pointer to such a list node which defines the starting point at which the data blocks for the particular strip can be accessed. Thus, as indicated in FIG. 8a, each list node includes a value which indicates the starting address for the DMA data block of a string of DMA data blocks. A next value indicates the number of bytes of data to transfer that comprise a data block. A further pointer value indicates a next entry in the list.

Figure 8B:
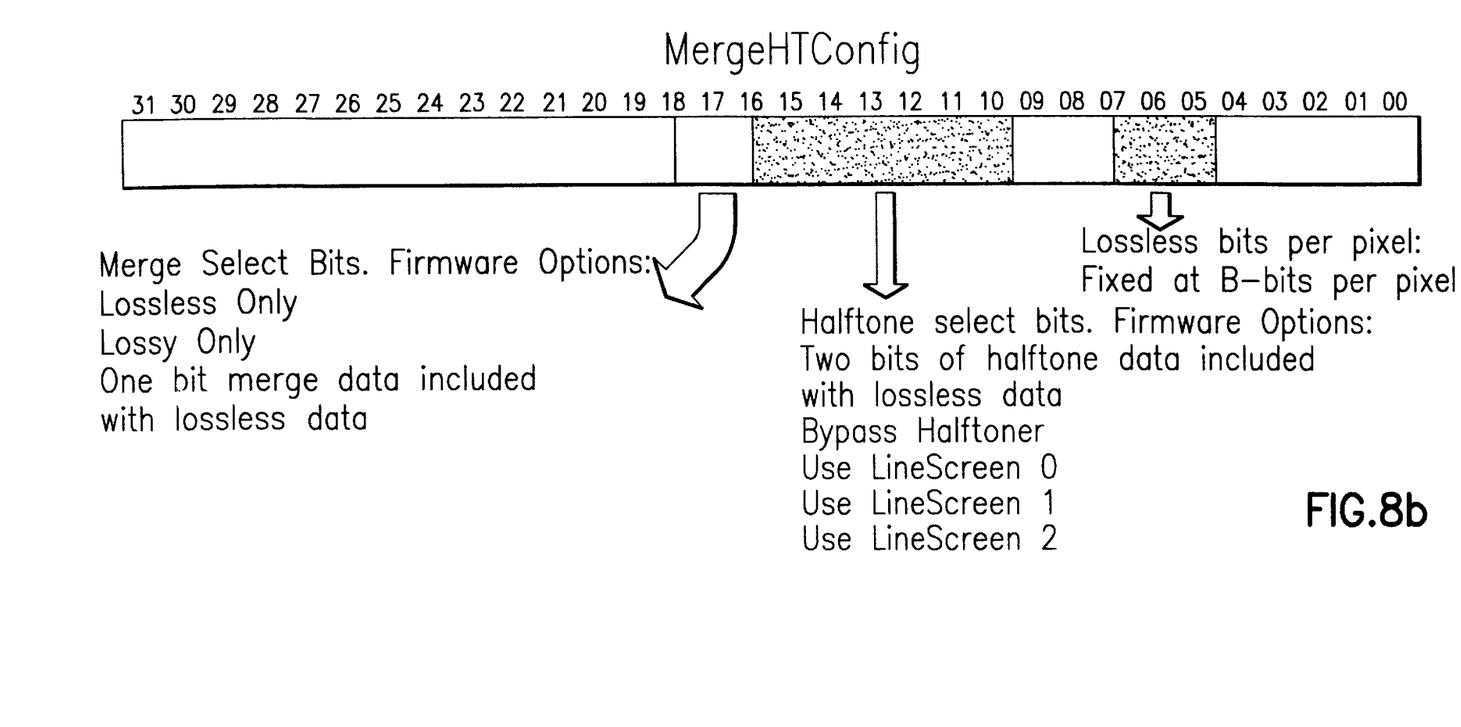
FIG. 8b is schematic illustration of data included in a merge configuration plane that is used to combine data blocks into an image format.

FIG. 8b illustrates a merge, half-tone, configuration plane which enables both the merge and halftone operations. As indicated above, the merge plane includes one bit per pixel which indicates whether a bit from a lossless channel or a lossy channel will be selected for the pixel during the pipeline operation. A further set of bits comprise halftone select bits which enable selection of one of the halftone line screens in the halftone table shown in FIG. 6. Finally, another set of values defines the number of lossless bits per pixel, a value normally fixed at 8 bits per pixel.

Page Rendering and Pipeline Control Firmware

Figure 9A:
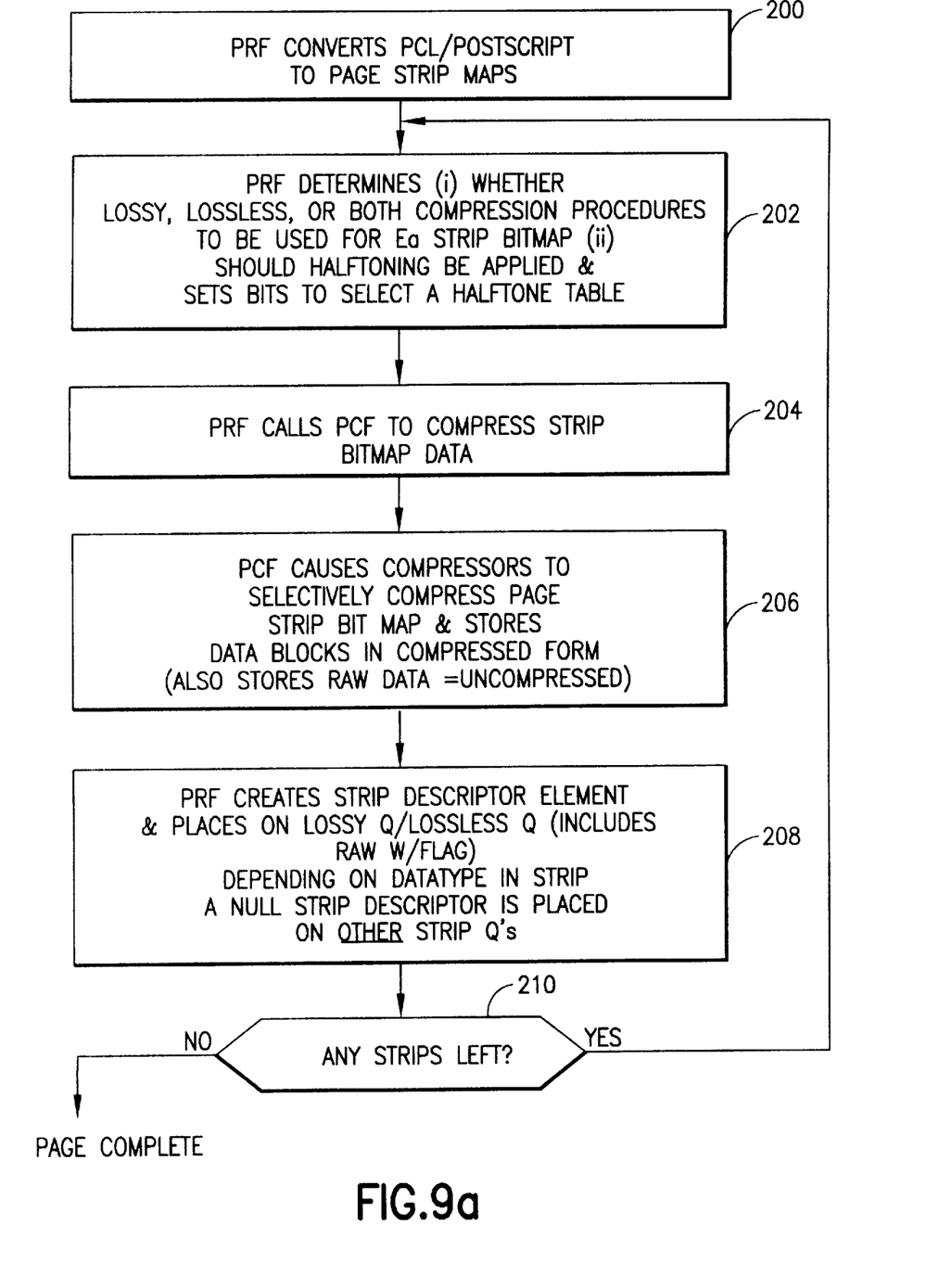
FIGS. 9a–9c illustrate a logic flow diagram of the method of the invention.
Figure 9B:
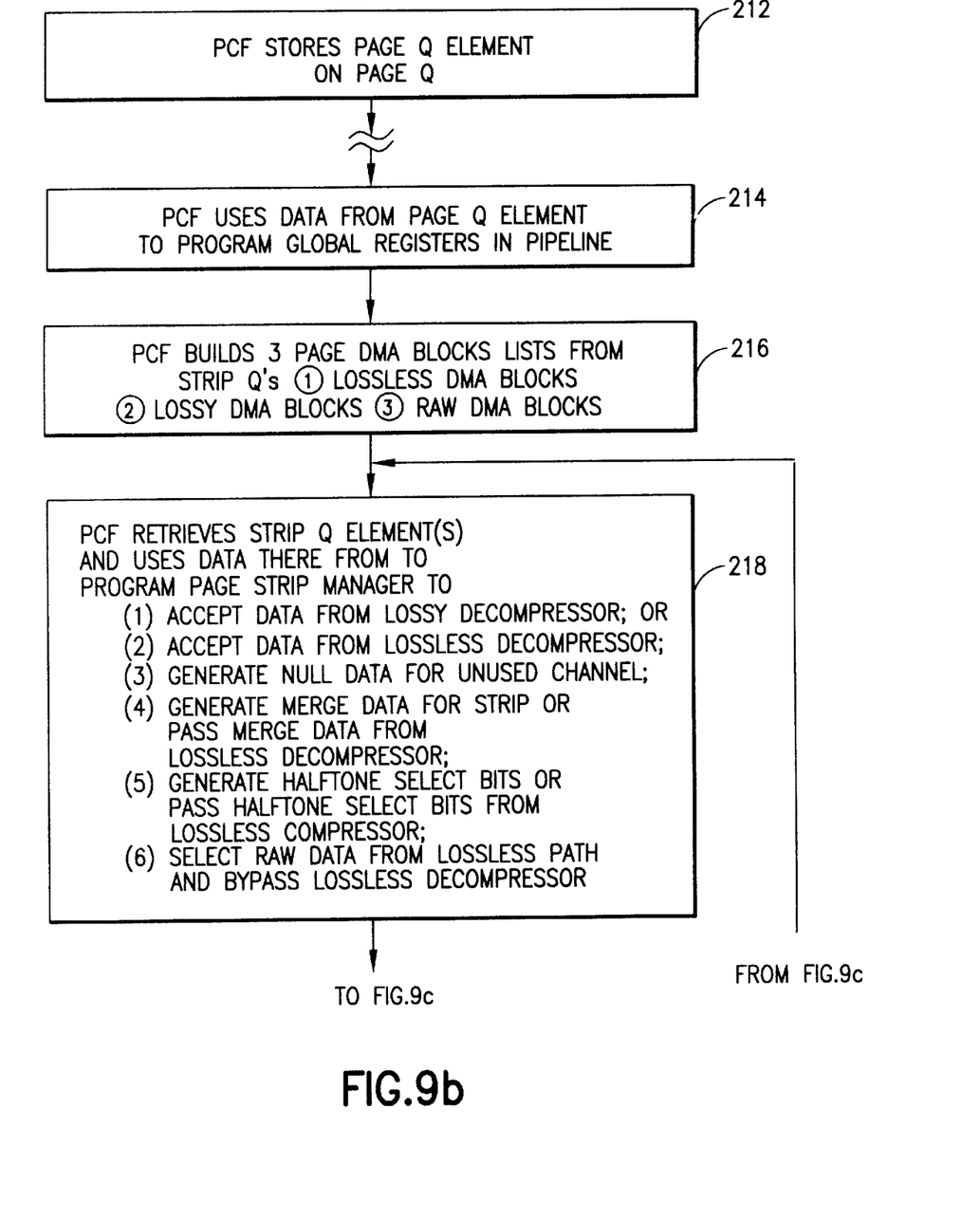
Figure 9C:
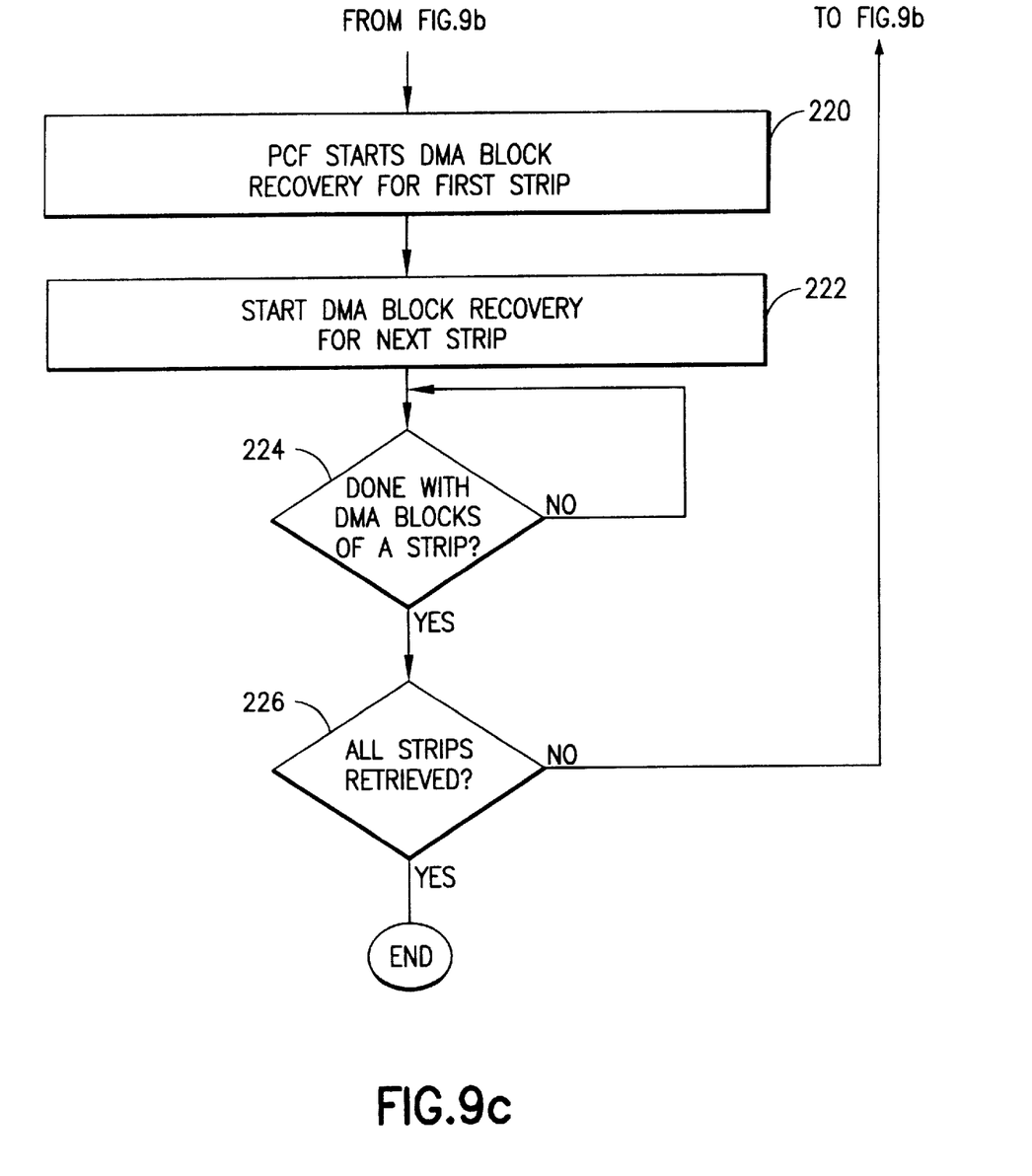

Turning now to FIGS. 9a–9c, the operation of both the page rendering firmware (PRF) 1 and the pipeline control firmware (PCF) 105 will be described, as they combine to control data flow through pipeline 100. Referring first to FIG. 9a, PRF 1 converts received PCL (printer control language) or PostScript configured print data into page strip maps in the manner known in the prior art (step 200). PRF 1 then determines (i) whether lossy or lossless compression (or both) is to be utilized for each strip bitmap and whether (ii) halftoning is to be applied. PRF 1 then sets the necessary bits to select a halftone table (step 202).

After this preliminary processing, PRF 1 calls PCF 105 to compress the strip bitmap data (step 204). In response to that call, PCF 105 controls lossy compressor 126 and/or lossless compressor 127 (FIG. 2) to selectively compress the page strip bitmap data in accordance with whether a page strip has been determined to be compressed using a lossy or lossless compression procedure. If the page strip includes portion(s) that are to be compressed using a lossy procedure and portion(s) that are to be compressed using a lossless procedure, both lossy compressor 126 and lossless compressor 127 are used for the page strip. The data blocks incorporating the compressed bitmap data are then stored in in region 110 of RAM 104. Further, if bitmap data is to be stored in raw or uncompressed form, such data is also stored in RAM 104.

Thereafter, PRF 1 creates a strip queue element in the form of either a lossy strip queue element or a lossless strip queue element, depending upon whether the data contained within the strip has been compressed by lossless compression unit 127 or lossy compression unit 126. Note that if a strip's bitmap data has been compressed using a lossy compression procedure, its strip queue element (i.e., see FIG. 5) is placed on lossy strip queue 111 and a strip queue element indicating a null value is listed on the lossless strip queue 112. In similar fashion, if a strip's bitmap data has been compressed using a lossless procedure, a strip queue element, such as shown in FIG. 4, is listed on lossless strip queue 112, while a strip queue element indicating a null value is listed on lossy strip queue 111. Finally, if a portion of a page strip has been compressed using a lossy compression procedure and another portion of the page strip has been compressed using a lossless procedure, then both a lossy strip queue element and a lossless strip queue element are created for the page strip. Those strip queue elements are then listed on lossy strip queue 111 and lossless strip queue 112, respectively. Note that the merge plane is thereafter used to enable a bit-by-bit recombination of the decompressed portions of such a page strip.

Except when a page strip has been compressed using both lossy and lossless compression methods, each page strip has a pair of queue elements that are listed on lossy strip queue 111 and lossless strip queue 112, with one element always indicating a null value, while the other includes a pointer to the first list node which lists the linked data blocks storing compressed data for the strip. If a strip contains only raw data blocks that have not been compressed, a strip queue element is placed on lossless strip queue 112, and includes a flag which identifies the data as raw or uncompressed data (step 208).

After each strip queue element is configured and stored, as above described, step 210 determines whether any strips are left to be processed and, if yes, the procedure recycles back to step 202 and continues. However, if all strips have had their data configured into compressed data blocks (or raw data blocks), a page complete indication is provided which enables PCF 105 to store a page queue element on page queue 113 (step 212).

It is to be understood that the print actions of print engine 16 await the queuing of a page queue element on page queue 113, in contrast to prior art monochrome print engines which would commence printing as soon as several page strips have been configured. In this instance, a full page is configured before printing commences.

Upon the commencement of a print action, PCF 105 uses data from a first page queue element listed on page queue 113 to program global registers in pipeline 100 (step 214). Those global registers receive the parameters recorded in the respective page queue element, as shown in FIG. 3. Those parameters are utilized to control the global processing of the page and are not changed from strip to strip. Next, the PCF 105 builds three page DMA data block lists from the strip queues comprising the entire page, i.e., a list of lossless DMA data blocks; a list of lossy DMA data blocks; and a list of raw data blocks (step 216).

At this point, PCF 105 has created for the page, from the two queues, three lists of DMA data blocks. The aforesaid queues and lists are then utilized to control the overall operations of pipeline 100 as the DMA blocks are accessed from RAM 104.

PCF 105 next retrieves a first strip queue element from each page strip queue and uses the data stored therein to program page strip manager 124. If the strip queue element is a null value strip element, page strip manager 124 generates the correct number of null data bits (white space on the media sheet) in a page strip and transmits those data bits down pipeline 100.

Page strip manager 124 employs the data found in the selected strip queue element to control the data flow into the succeeding elements of pipeline 100 during subsequent operations of pipeline 100 (step 218). More specifically, if the respectively accessed strip queue element indicates that the data blocks linked thereto have been compressed using a lossy procedure, page strip manager 124 is programmed to accept data from lossy decompression unit 126. By contrast, if the strip queue element indicates that the data in the data blocks linked thereto have been compressed using a lossless compression procedure, then page strip manager 124 is programmed to accept data from lossless decompressor unit 127.

Further, as indicated above, each strip queue includes a strip queue element denoting the actual configuration of data in a strip. Further, a concurrent entry may be present one strip queue which indicates a null value (assuming the page strip includes data compressed using only one compression procedure). Accordingly, each time PCF 105 retrieves a strip queue element from one queue it may also retrieve a strip queue element from the other queue, as required.

Page strip manager 124 is programmed to generate null data for a null strip queue element and to dispatch the null data down the lossy or lossless channel, depending from which queue the null strip queue element originated. The dispatched null data assures that properly configured data will always exit from channel carrying the "null" data and will not corrupt the downstream procedures in pipeline 100.

PCF 105 further utilizes data from the lossless/lossy strip queue element and employs the values found therein to configure both merge unit 128 and halftone unit 130. As indicated above, the configuration data values are then dispatched along with the lossy/lossless decompressed data blocks down the pipeline. Lastly, PCF 105 selects raw data from the lossless path (by sensing a flag associated therewith) that has not been compressed and causes it to bypass lossless decompressor 127.

Once PCF 105 has programmed a first set of registers in page strip manager 129 for a first strip queue element, a second set of registers within page strip manager 124 are similarly programmed for a second strip queue element. As indicated above, "ping pong" sets of registers are employed so that as one page strip is being processed in pipeline 100, a next page strip can be loaded and prepared for processing.

After page strip manager 124 has been programmed, PCF 105 starts DMA data block recovery for the first strip (step 220). The accessed data blocks from both queues associated with the first page strip are fed in parallel down pipeline 100 and are processed in accord with the programming of each individual unit therein. While the processing of the data blocks from the first strip is on-going, DMA data block recovery is commenced for a next page strip (step 222). Until all data blocks for a strip have been retrieved and processed (decision step 224), the procedure recycles. Until all strips have been retrieved and processed (decision step 226), the procedure recycles back to step 218 and repeats. Otherwise, the operation for the particular page is at an end.

As can seen from the above description, control of pipeline 100 is handled by PCF 105 in a manner that is substantially separate from the image processing carried out by PRF 1. Accordingly, PCF 105 can remain unchanged if a change is made to PRF 1 to accommodate change(s) to the printer control language. This arrangement further enables pipeline 100 to remain unchanged in such an event.

Although several embodiments of the invention have been illustrated, and their forms described, it is readily apparent to those of ordinary skill in the art that various modifications may be made therein without departing from the spirit of the invention or from the scope of the appended claims. For instance, while the invention has been described as being configured in the form of firmware, it could also be configured in the form of software on a media disc or other storage device that is loaded into the printer as needed.

What is claimed is:

1. A method for operating a configurable image processing pipeline, said pipeline including compression/decompression modules, a page strip manager, a color space conversion module, a merge module and a halftone module, said method comprising the steps of:

a) segregating a page of image data into page strips;

b) selectively processing each page strip of image data to achieve a compression thereof and a conversion thereof into data blocks that are stored in a memory;

c) creating, for each page strip, a strip queue element which includes information indicating a compression procedure or compression procedures that have been used to achieve said compression and a pointer to a linked list of data blocks which comprise the page strip;

d) listing each said strip queue element on either or both a lossy strip queue or a lossless strip queue, depending upon the compression procedure(s) that have been used to achieve compression of a respective page strip, and further placing a null indicator on a strip queue for a strip whose strip queue element is listed only on another strip queue;

e) creating a page element which designates global parameters to be used by said pipeline during processing of said page strips;

f) building plural lists of data blocks comprising a page, said lists including a lossy compressed list, a lossless compressed list and a raw data block list;

g) employing said global parameters from said page element to program modules in said pipeline;

h) for each page strip, programming said page strip manager to accept data blocks from one or more of said lists of data blocks in accordance with information in an associated strip queue element and to pass said data blocks to one or more modules included in said pipeline; and i) operating said pipeline in accord with said programming to decompress data blocks from each page strip and to pass said data blocks to said one or modules in said pipeline.

2. The method as recited in claim 1, wherein step h) further generates a merge map for a page strip which indicates how data from said data blocks are to be arranged on a printed page, said merge module being controlled by said merge map.

3. The method as recited in claim 2, wherein said merge map for a page strip indicates on a bit-by-bit basis how data from said data blocks are to be combined.

4. The method as recited in claim 1, wherein step c) further includes information in a strip queue element regarding a halftone procedure that is to be used with the respective strip, said halftone module controlled by said information to utilize the halftone procedure indicated thereby.

5. The method as recited in claim 1, wherein plural data channels couple said page strip manager to modules of said pipeline, and step h) further programs said page strip manager to both pass data blocks of image data via said data channels and to concurrently pass data blocks of null data on any channel that is not occupied by said data block of image data, whereby said modules of said pipeline are enabled to operate on null data in addition to image data.

6. The method as recited in claim 5, wherein step i) causes said page strip manager to direct data blocks of image data to a decompressor module in accord with a queue on which said data blocks are listed so as to enable decompression of the data stored therein.

7. The method as recited in claim 1, wherein steps a) through e) are carried out under control of page rendering firmware module and steps f) through i) are carried out under control of a pipeline control firmware module.

8. A memory media for controlling a processor to operate a configurable image processing pipeline, said pipeline including compression/decompression modules, a page strip manager, a color space conversion module a merge module and a halftone module, said memory media comprising:

a) means for controlling said processor to segregate a page of image data into page strips;

b) means for controlling said processor to selectively process each page strip of image data to achieve a compression thereof and a conversion thereof into data blocks that are stored in a memory;

c) means for controlling said processor to create, for each page strip, a strip queue element which includes information indicating a compression procedure or compression procedures that have been used to achieve said compression and a pointer to a linked list of data blocks which comprise the page strip;

d) means for controlling said processor to list each said strip queue element on either or both a lossy strip queue or a lossless strip queue, depending upon the compression procedure(s) that have been used to achieve compression of a respective page strip and to further place a null indicator on a strip queue for a strip whose strip queue element is listed only on another strip queue;

e) means for controlling said processor to create a page element which designates global parameters to be used by said pipeline during processing of said page strips;

f) means for controlling said processor to build plural lists of data blocks comprising a page, said lists including a lossy compressed list, a lossless compressed list and a raw data block list;

g) means for controlling said processor to employ said global parameters from said page element to program modules in said pipeline;

h) means operative, for each page strip, to control said processor to program said page strip manager to accept data blocks from one or more of said lists of data blocks in accordance with information in an associated strip queue element and to pass said data blocks to one or more modules included in said pipeline; and i) means for controlling said processor to operate said pipeline in accord with said programming to decompress data blocks from each page strip and to pass said data blocks to said one or modules in said pipeline.

9. The memory media as recited in claim 8, wherein means h) further controls said processor to generate a merge map for a page strip which indicates how data from said data blocks are to be arranged on a printed page, said merge module being controlled by said merge map.

10. The memory media as recited in claim 9, wherein said merge map for a page strip indicates on a bit-by-bit basis how data from said data blocks are to be combined.

11. The memory media as recited in claim 8, wherein means c) further controls said processor to include information in a strip queue element regarding a halftone procedure that is to be used with the respective strip, said halftone module controlled by said information to utilize the halftone procedure indicated thereby.

12. The memory media as recited in claim 8, wherein plural data channels couple said page strip manager to modules of said pipeline, and means h) further controls said processor to program said page strip module to both pass data blocks of image data via said data channels and to concurrently pass data blocks of null data on any channel that is not occupied by said data block of image data, whereby said modules of said pipeline are enabled to operate on null data in addition to image data.

13. The memory media as recited in claim 12, wherein means i) controls said processor to cause said page strip manager to direct data blocks of image data to a decompressor module in accord with a queue on which said data blocks are listed so as to enable decompression of the data stored therein.

14. The memory media as recited in claim 8, wherein means a) through means e) are configured in a page rendering firmware module and means f) through means i) are configured in a pipeline control firmware module.

* * * * *